INVENTORS
WILLIAM H. WANNAMAKER JR
JAMES C. MOUZON
BY Arthur H. Swanson
ATTORNEY Nov. 7, 1950  W. H. WANNAMAKER, JR., ET AL  2,528,626
CONTROL APPARATUS
Filed April 30, 1947  3 Sheets-Sheet 2
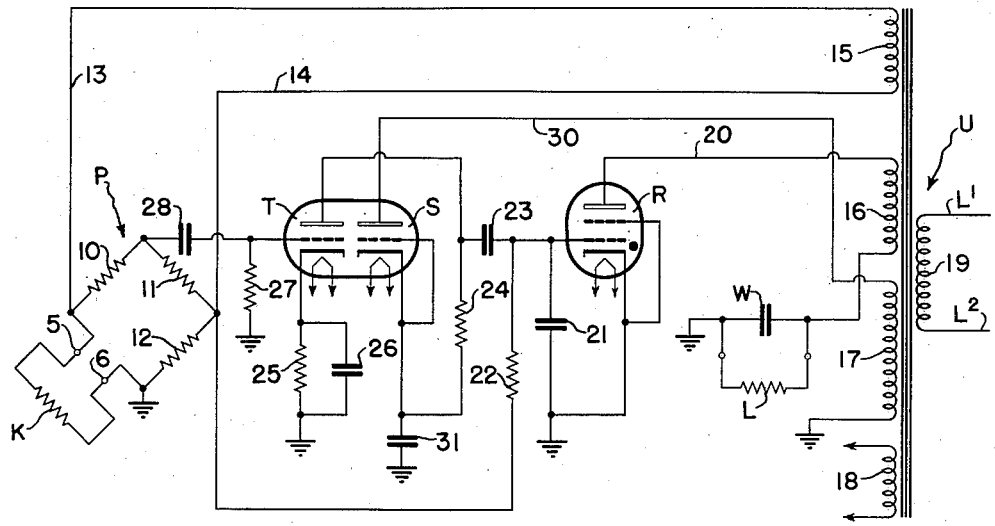
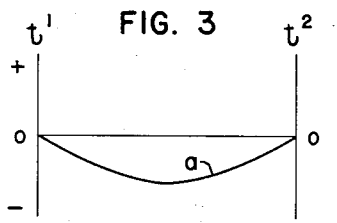
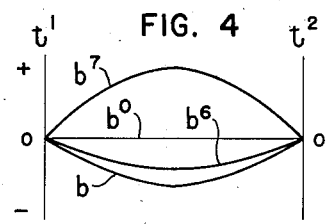
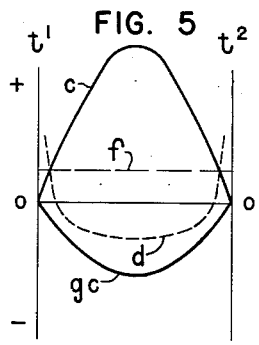
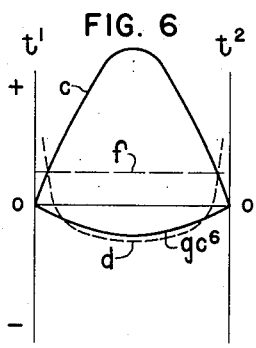
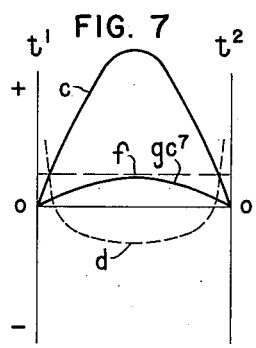
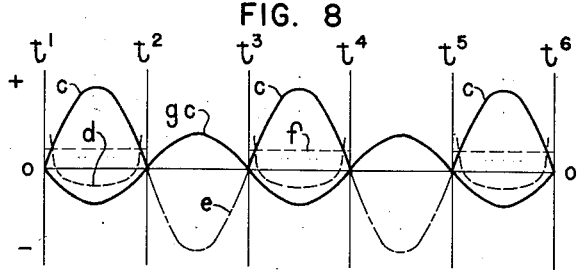
*INVENTORS*
WILLIAM H. WANNAMAKER JR
JAMES C. MOUZON
BY
Arthur H. Swanson
ATTORNEY Nov. 7, 1950 W. H. WANNAMAKER, JR., ET AL 2,528,626
CONTROL APPARATUS Filed April 30, 1947 3 Sheets-Sheet 3

INVENTORS
WILLIAM H. WANNAMAKER JR.
JAMES C. MOUZON
BY
Arthur H. Swanson
ATTORNEY Patented Nov. 7, 1950

2,528,626

UNITED STATES PATENT OFFICE 2,528,626

CONTROL APPARATUS

William H. Wannamaker, Jr., Flourtown, and James C. Mouzon, Wyndmoor, Pa., assignors, by mesne assignments, to Minneapolis-Honeywell Regulator Company, Minneapolis, Minn., a corporation of Delaware Application April 30, 1947, Serial No. 745,006

4 Claims. (Cl. 219—20)

1

The present invention relates to electric control apparatus comprising means for automatically regulating an electric current, and the general object of the invention is to provide improved apparatus for varying an electric current in predetermined accordance with changes in a control quantity or condition. More specifically, the object of the present invention is to provide novel means for regulating the output current of an electronic valve of the thyratron type, so as to vary the average value of said current and thereby produce graduated control effects in response to variations in a control quantity.

The invention is of special utility for use in apparatus in which the output current of the thyratron is employed as a heating current, and is varied in response to the temperature of the apparatus heated by the current, and a prime object of the invention is to provide improved control means for regulating the heating current used to regulate the temperature of the metallic body of a radiation pyrometer in the general manner disclosed in the application of Thomas R. Harrison, Serial No. 658,163, filed March 29, 1946. Such regulation may be effectively utilized to minimize errors in the pyrometer temperature measurements due to variations in the ambient temperature, or due to the radiation of heat between the pyrometer and sources other than the source to be measured.

In the preferred form of the present invention, the heating element for the pyrometer body is a resistance heating coil which is connected in series with an electronic valve of the thyratron type and a source of alternating current, and a specific object of the present invention is to provide simple and effective means for causing the thyratron to fire at intervals, automatically varied as to their frequency of occurence as required to provide a graduated control of the current supplied to the heating element.

Another specific object of the present invention is to provide control means as specified above including a resistance bridge and a thyratron, both of which are directly energized from the same source of alternating current to provide compensation for fluctuations in the alternating current supply voltage and hence to prevent such fluctuations from affecting the accuracy of operation of the control means.

The various features of novelty which characterize our invention are pointed out with particularity in the claims annexed to and forming a part of this specification. For a better understanding of the invention, however, its advantages, and specific objects attained with its use, reference should be had to the accompanying drawing and descriptive matter in which we have illustrated and described a preferred embodiment of the invention.

Of the drawings:

Fig. 2 is a circuit diagram illustrating an automatically controlled heating system for the pyrometer body shown in Fig. 1;

Fig. 3 is a diagram showing an alternating grid voltage component of constant amplitude;

Fig. 4 is a diagram showing varying values of a second alternating grid voltage component;

Fig. 5 is a diagram showing the characteristic curves of a thyratron and a grid voltage curve corresponding to a particular operating condition;

Figs. 6 and 7 are diagrams, each differing from Fig. 5 and from one another only in that its grid voltage curve corresponds to a different operating condition;

Fig. 8 is a diagram illustrating thyratron voltage and current relations under the operating condition in which the pyrometer body is fully heated;

Figure 1:
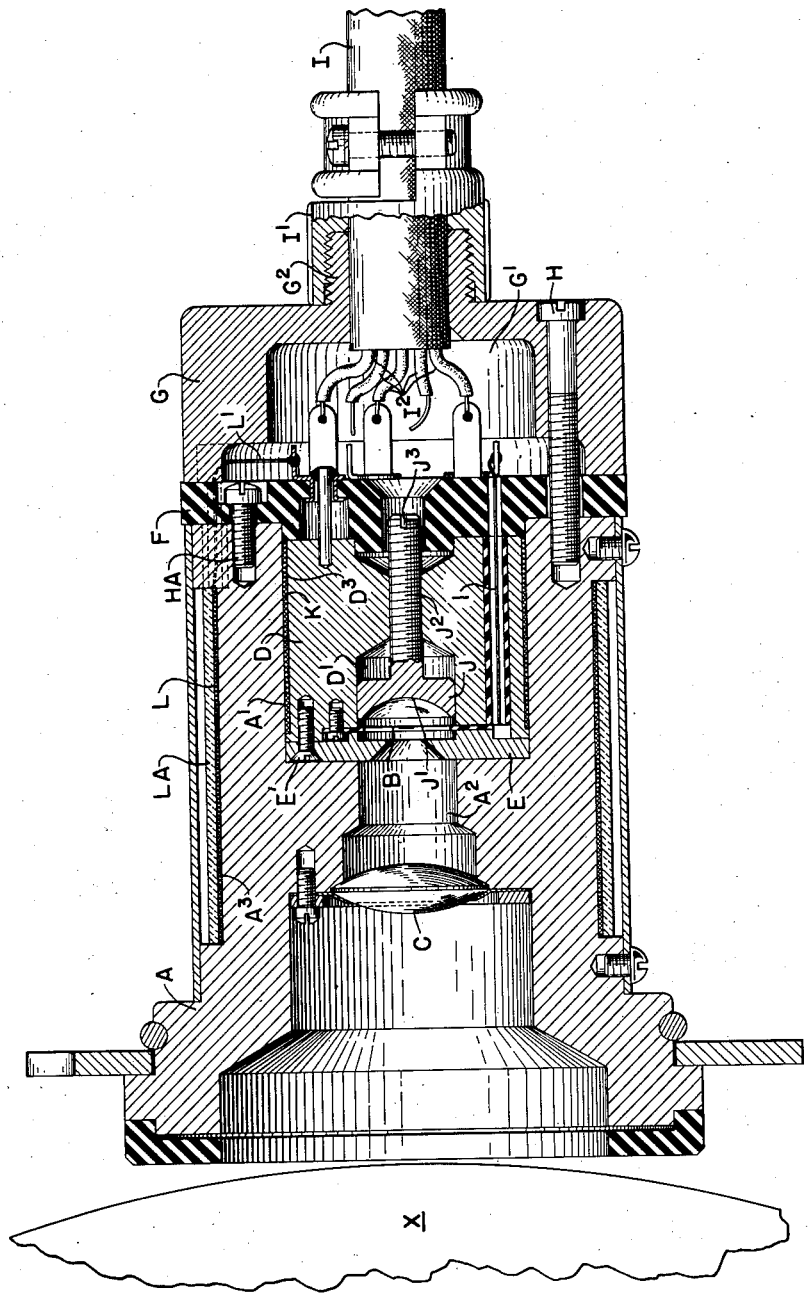
Fig. 1 is an elevation in section of a pyrometer with which the present invention may be used.

In Fig. 1 we illustrate, by way of example, a radiation pyrometer structure of the type disclosed and claimed in the copending application of Clarence A. Dyer, Serial No. 725,847, filed February 1, 1947. The pyrometer of Fig. 1 includes a heating coil L for heating the pyrometer housing body A, and in Fig. 2 we diagrammatically illustrate the use of a preferred form of the present invention in controlling the temperature of the body A. The body A is a relatively massive metallic part formed of aluminum or other metal of good heat conductivity, and is chambered to provide a space in which a thermopile B and a lens C are mounted and through which heat rays received from an external body X are received and focused on the thermopile B.

As shown, the thermopile B is supported by and forms a part of an assembly unit comprising a cylindrical body element D, an annular thermopile retaining element E, secured by screws E' to the front end of the body D, and a terminal disc F secured by screws (not shown) to the rear end of the body D. The elements D and E are formed of aluminum or other good heat conducting metal, and the disc F is formed of insulating material such as bakelite. The unit including the members D, E, and F is adapted for insertion in and removal from a cylindrical chamber A' extending into the body A from its rear end and coaxial with the lens C. The chamber space A' is larger in diameter than a chamber space A² which extends between the space A' and the lens C.

The thermopile B comprises a plurality of thermocouples having their hot and cold junctions arranged and disposed in the pyrometer body A generally as disclosed in the Thomas R. Harrison Patent 2,357,193, of August 29, 1944. The hot junctions of the thermopile B are flattened and disposed in the central portion of the chamber A', and the cold junction portions are clamped between the retaining member E and the annular portion of the member D which surrounds a mirror chamber D' in the front end portion of the member D. The various thermocouples are connected in series with one another between a terminal conductor 1 and a second terminal conductor, not shown. Those conductors extend rearwardly from the thermopile through longitudinal passages, formed in the member D and lined with insulating material, and through registering openings formed in the member F, and are respectively attached to corresponding terminal parts supported by the member F.

The heating coil or resistor L is wound in a grooved portion A³ provided in the body A, and is covered by a layer of asbestos insulation LA. The ends of the coil L pass through the body A as insulated conductors, one of which is shown at L' in Fig. 1, and terminate at respective terminal parts on the member F.

A thermometer resistance K is wound in a grooved portion D³ of the member D, and is responsive to the temperature of the body A and the parts thereof. The ends of the thermometer resistance K pass through the body A as insulated conductors and terminate at respective terminal parts on the member F.

The previously mentioned terminal parts serve to connect conductors at the opposite sides of the disc F, and are mounted in the latter and extend into a chamber space G' formed in a cap-shaped cover or end member G. The latter is detachably secured to the rear end of the body A by bolts H which extend through the cap member G and through registering openings in the disc F and are screwed into threaded sockets formed in the body A. The disc F is separately secured to the body A by bolts or screws HA. The end member G is formed with an axial passage surrounded by an externally threaded tubular boss G² engaged by a cable clamp I' for anchoring in place the body of a cable I extending into the chamber space G'. The end of each of the conductors I² included in the cable I is connected to a corresponding one of said terminal parts. Since the thermopile B may be similar in type and form to the thermopile illustrated and described in detail in said prior Patent 2,357,193, it need not be further illustrated or described herein.

The previously mentioned chamber D', formed in the front end portion of the member D, receives a mirror formed by the polished concave front end surface J' of a stainless steel mirror body J. The latter is provided at its rear side with a threaded stem or spindle J² threaded in and extending through a threaded axial passage formed in the portion of the member D at the rear of the chamber D'. The rear end of the stem J² is formed with a slot or kerf J³, and when the cap member G is removed, a screw driver may be placed in the kerf J³ to rotate the stem J² and thereby axially adjust the mirror J toward and away from the thermopile B.

In the preferred arrangement for regulating the current flow in the heating resistor L in accordance with the temperature of the thermometer resistance K, illustrated diagrammatically in Fig. 2, the thermometer resistance K forms part of a resistance bridge P which controls the firing of an electronic valve R which is of the thyratron type and has the heating resistor L in its output circuit. The means through which the thyratron is controlled comprises an electronic rectifier S supplying anode current to an electronic amplifier triode T and energized by an alternating current transformer U. The transformer U also supplies energizing current to the bridge P and supplies anode current to the thyratron R. A condenser W, connected in parallel with the heating resistance L, cooperates with the other elements of the control system to determine the frequency with which the thyratron R is made conductive and fires. Thus the condenser W provides proportional control of the heating resistor L, in response to the temperature measured by the thermometer resistance K, in a manner to be described.

The thermometer resistance K forms one of the four arms of the resistance bridge P, the other arms being formed by resistors 10, 11 and 12. As shown, one end of the resistance K is connected by a terminal member 5 to one end of the resistor 10, and the other end of the resistance K is connected by a terminal member 6 to one end of the resistor 12. The second end of the resistor 12 is connected by the resistor 11 to the second end of the resistor 10. The point at which the thermometer resistance K and the resistor 10 are connected constitutes one input terminal of the bridge P, and the second input terminal of the bridge is formed by the junction point of the resistors 11 and 12. The input terminals of the bridge P are connected by conductors 13 and 14, respectively, to the terminals of a secondary winding 15 of the transformer U. The transformer U has three other secondary windings, 16, 17, and 18, and has a primary winding 19. The primary winding 19 is connected across supply conductors L' and L², which may form part of a power distribution system supplying alternating current of conventional frequency and voltage: for example, 60 cycles per second and 115 volts.

The heater resistance L and condenser W are connected in parallel with one another between ground and one terminal of the transformer secondary winding 16. The second terminal of that winding is connected by a conductor 20 to the anode of the thyratron R. The latter has its cathode connected directly to ground. As shown, the thyratron R is of the commercially available 2050 type which has a suitably linear grid-control characteristic, the need for which is explained hereinafter. The thyratron R has its shield grid connected to its cathode and has its control grid connected to ground through a condenser 21. Said control grid is also connected through an isolation resistor 22 to that input terminal of the bridge P which is connected by the conductor 14 to one terminal of the transformer secondary winding 15. The control grid of the thyratron R is also connected by a condenser 23 to the anode of the amplifier valve T.

The anode of the valve T is connected through resistor 24 to the cathode of the rectifier valve S which supplies anode current to the valve T.

The cathode of the valve T is connected to ground through a resistor 25 and a condenser 26 in parallel therewith. The control grid of the valve T is connected to ground through a grid resistor 27, and is connected through a condenser 28 to an output terminal of the bridge P at which the bridge resistors 10 and 11 are connected. The second output terminal of the bridge P, which is the junction of the thermometer resistance K with the bridge resistor 12, is grounded. The anode of the rectifier valve S is connected by a conductor 30 to one terminal of the transformer secondary winding 17 which has its second terminal connected to ground. The cathode of the rectifier valve S is connected to ground through a filter condenser 31. The transformer secondary winding 18 supplies cathode heating current to the valves R, S and T.

In the normal operation of the apparatus shown diagrammatically in Fig. 2, current is supplied to the pyrometer heating resistor L when the temperature of the pyrometer body A is lower than is desirable, at an average rate which depends on the extent to which the temperature of the thermometer resistance K is below its normal value. The average rate at which heat is supplied to the pyrometer body depends on the frequency with which the thyratron R of Fig. 2 is made conductive.

Figure 9:
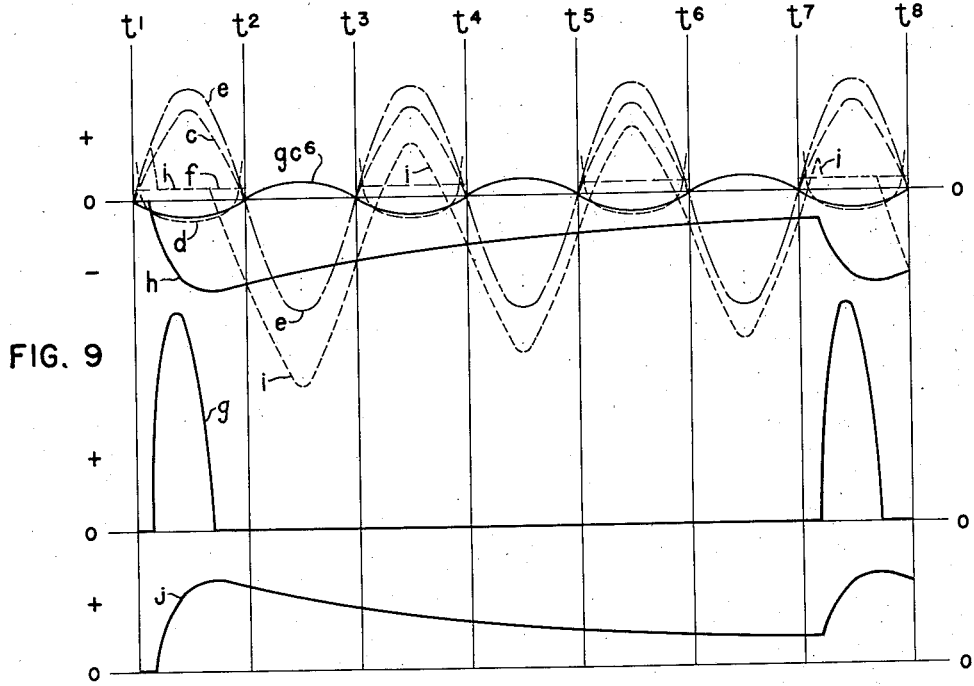
Fig. 9 is a diagram illustrating thyratron voltage and current relations under operating conditions in which heat is being supplied to the pyrometer body at a rate less than the maximum rate.
Figure 10:
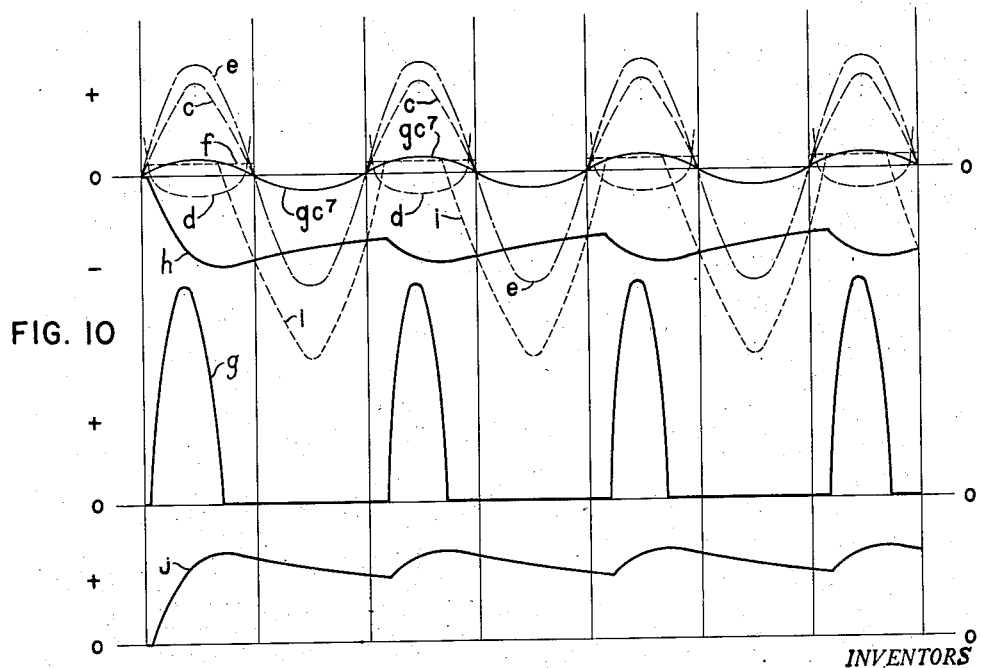
Fig. 10 is a diagram similar to that of Fig. 9 illustrating thyratron voltage and current relations under the operating condition in which heat is being supplied to the pyrometer body at a maximum rate.

When the temperature of the thermometer resistance is much below normal, the thyratron R fires during one half of each complete cycle of the alternating current voltage induced in the transformer secondary winding 16. This condition is illustrated in Fig. 10. When the temperature of the thermometer resistance K is below normal by an amount smaller than that required for the operation illustrated in Fig. 10, the thyratron will be made conductive at intervals which are less frequent and depend on the difference between the normal and actual temperatures of the thermometer resistance K. Thus, as shown in Fig. 9, the thyratron may be made conductive during the first half of every third cycle. With the thermometer resistance temperature somewhat lower than it is in the Fig. 9 condition of the apparatus, the thyratron R may be made conductive every second cycle, and when the thermometer resistance temperature is somewhat higher than it is in the Fig. 9 condition of the apparatus, the thyratron R may be made conductive every fourth, fifth, or sixth cycle, or at still less frequent intervals.

Whether the thyratron R is or is not made conductive during each half cycle in which the transformer secondary winding 16 makes the thyratron anode positive relative to the thyratron cathode, depends upon the then existing plate-cathode, or anode-cathode voltage, and grid-cathode voltage. By the term "plate-cathode" voltage or term "anode-cathode" voltage we mean the potential difference between the plate and cathode of the thyratron R, and by the term "grid-cathode" voltage, we mean the potential difference between the control grid and cathode of the thyratron R.

With the arrangement shown in Fig. 2, each of the grid-cathode voltages designated in Figs. 5–10 by one or another of the symbols $gc$, $gc^6$, or $gc^7$ is the resultant of an alternating bias voltage component $a$ of approximately constant amplitude, shown by the curve of Fig. 3, and a second variable alternating voltage component. Different values of the last mentioned voltage component are indicated by the curves $b$, $b^6$, $b^0$ and $b^7$ in Fig. 4. As is indicated in Fig. 4, the variable component of the grid-cathode voltage may vary in amplitude in each direction from the zero value $b^0$, and when below the zero value said variable component is in phase with the voltage component $a$, and when above its zero value the variable voltage component is 180° out of phase with the component $a$. The period $t'$—$t^2$ represents a half cycle of the supply voltage during which the anode of the thyratron R is positive with respect to its cathode.

The conditions under which the thyratron R becomes conductive and non-conductive are explained hereinafter by reference to a critical anode or plate voltage curve $c$ and a critical grid voltage curve $d$ shown in each of Figs. 5–10. At this point it is noted that in each of the voltage curves shown in Figs. 3–10, the horizontal line O—O represents a base voltage or ground potential, and in each of said figures the vertical displacement upward from the base line $o$—$o$ to a voltage curve point above the base line represents a voltage or potential more positive than the base potential by an amount proportional to the displacement distance. Similarly, in each of said figures, the vertical displacement downward from the base line to a point on a voltage curve below the base line represents a potential or voltage correspondingly more negative than the base voltage. In each of said figures also, the vertical line $t'$ represents the beginning time of the first half cycle of voltage alternation during the period of operation to which the figure pertains, and the vertical lines $t^2$, $t^3$, etc. represent the time at which subsequent half cycles in the period begin.

The thyratron grid bias voltage component $a$ of substantially constant amplitude is transmitted to the control grid of the thyratron R through the isolation resistor 22 from the end of the resistor 12 of the resistance bridge P which is connected to the transformer secondary winding 15 by the conductor 14. The cathode of the thyratron R is connected to the other end of the resistor 12 through the common ground connection. The magnitude of the voltage component $a$ is proportional to the potential drop through the bridge resistor 12, produced by the transformer winding 15. Each of the variable thyratron grid-cathode voltage components $b$, $b^6$, $b^0$, or $b^7$, shown in Fig. 4, is impressed on the control grid of the valve R through the condenser 23 by the output circuit of the amplifier T. Said variable component is created by amplifying the alternating current signal which the output circuit of the bridge P impresses on the control grid of the valve T through the coupling condenser 28.

The circuit elements shown in Fig. 2 are so proportioned and arranged that when the temperature and resistance of the thermometer resistance K are high enough so that no current then needs to be supplied to the pyrometer heating resistor L, the variable component of the grid-cathode voltage may take the form of the component $b$ of Fig. 4 which is in phase with the component $a$. The resultant of the components $a$ and $b$, represented in Fig. 5 by the curve $gc$, is more negative than the critical grid voltage $d$. In consequence, as is hereinafter explained, the valve R is then non-conductive. Any further increase in the temperature and resistance of the thermometer resistance K will make the component $b$ more negative without changing its phase, and will have no tendency to make the thyratron R conductive. On a sufficient decrease in the temperature and resistance of the thermometer resistance K, the value of the variable voltage component may attain the value represented by the curve $b^6$ of Fig. 4. The resultant voltage $gc^6$ of the voltage components $a$ and $b^6$ is less negative than the critical voltage $d$, as is indicated in Fig. 6, and makes the thyratron R conductive.

When the temperature and resistance of the thermometer resistance K are progressively decreased from the values corresponding to the variable voltage component $b^6$, that component first attains the zero or base voltage value represented in Fig. 4 by the horizontal line $b^0$, and thereafter attains some value such as that represented in Fig. 4 by the curve $b^7$, which is no longer in phase with the voltage component $a$, but is 180° out of phase with that component. As shown, the amplitude of the component $b^7$ exceeds the amplitude of the component $a$ so that the resultant grid bias voltage $gc^7$ of Fig. 7 is positive with respect to the critical grid voltage $d$ and is in phase with the plate voltage $c$.

When the thyratron is operated with alternating voltages impressed on its input and output circuits, the operation of the thyratron with various plate and grid voltages is conveniently explained by the use of the theoretical critical plate and grid voltage curves $c$ and $d$, respectively, shown in Figs. 5–10. The thyratron will be in its non-conducting condition when the grid-cathode voltage $gc$ is negative with respect to the critical grid voltage $d$, as shown in Fig. 5, assuming that the plate-cathode voltage then being applied to the thyratron by the transformer secondary winding 16 is equal to or less than the critical plate voltage $c$. The thyratron may be converted from its non-conducting condition, illustrated in Fig. 5, by a change in the grid-cathode voltage $gc$ which makes the latter less negative or more positive with respect to the critical grid voltage $d$, as by giving it the value represented by the curve $gc^6$ of Fig. 6, or $gc^7$ of Fig. 7. Without change in the grid-cathode voltage $gc$, the thyratron may also be converted into its conducting condition by increasing the plate-cathode voltage a sufficient amount above the critical plate voltage curve $c$.

The critical grid voltage curve $d$ of Fig. 5 represents the locus of the maximum negative values of the grid-cathode voltage which will permit the thyratron to fire when the corresponding critical plate voltage C exists. For any given instantaneous value of the plate-cathode voltage located on the critical plate voltage curve $c$, a grid-cathode voltage equal to or greater in the positive direction than the corresponding critical grid voltage will cause the thyratron to become conductive and fire. Similarly, for any instantaneous value of the grid-cathode voltage located on the critical grid voltage curve $d$, a corresponding plate-cathode voltage equal to or greater than the corresponding critical plate voltage will cause the thyratron to become conductive and fire. Similarly, with any given plate-cathode voltage which is less than the critical plate voltage $c$, the thyratron can be made conductive and caused to fire by a grid-cathode voltage which is sufficiently less negative or more positive than the corresponding critical grid voltage $d$.

Fig. 8 represents a condition of operation of the thyratron R in which the actual grid-cathode voltage $gc$ is more negative than the critical grid voltage $d$ and in which there is, therefore, no current flow through the heating resistor L and condenser W. In Fig. 8, the curve $e$ represents the voltage impressed on the output circuit of the thyratron R by the transformer secondary winding 16. In the Fig. 8 condition in which there is no current flow in the thyratron output circuit, the positive portions of the curve $e$ above the base line $o$—$o$ are assumed to coincide with the critical plate voltage curves $c$. Under such conditions, the thyratron will remain non-conductive so long as the actual grid-cathode voltage of the thyratron is more negative than the critical grid voltage $d$.

Under operating conditions in which the grid-cathode voltage of the thyratron attains a value less negative than the critical grid voltage value $d$ while the plate voltage is not less positive than the critical plate voltage $c$, the thyratron R will become conductive and will be caused to fire at least once. If the actual grid-cathode voltage should then remain at a value less negative than the critical grid voltage, the thyratron will be made repeatedly conductive at intervals, the frequency of occurrence of which depends upon the relative magnitudes of the actual grid-cathode voltage and the critical grid voltage, and upon the voltage across the condenser W, which determines the plate-cathode voltage.

The Fig. 9 diagram includes related curves $c$, $d$, $e$, $gc^6$, $f$, $g$, $h$, $i$, and $j$ which collectively illustrate the normal operation of the control system shown in Fig. 2 produced by a slight but continuously maintained decrease in the temperature of the thermometer resistance K below the control point.

At the zero time, or beginning of the operation illustrated in Fig. 9, the plate supply voltage $e$, grid-cathode voltage $gc^6$, and plate-cathode voltage $i$ are equal to zero. When the plate supply voltage $e$ has increased slightly beyond the ionization potential $f$ of the thyratron, the latter fires, since the actual grid-cathode voltage $gc^6$ is then slightly above the corresponding critical grid voltage. Prior to the time at which the thyratron fires, the condenser W is assumed to have no charge. At the instant the tube fires, plate current $g$ begins to flow through the thyratron, the condenser W begins to charge, the voltage $h$ across the condenser starts to build up, and the plate-cathode voltage $i$ then ceases to follow the plate supply voltage $e$ and remains constant at approximately the ionization voltage $f$ of the thyratron, as the plate supply voltage builds up above the voltage $f$. The voltage $h$ across the condenser W, which is negative with respect to the supply voltage $e$, continues to increase until it becomes large enough to reduce the plate supply voltage $e$ below the value necessary to maintain the thyratron in a conductive condition.

The thyratron then stops firing, the plate current $g$ ceases to flow, and the condenser voltage $h$ stops increasing and starts to decrease slowly as the condenser discharges through the heating resistance L. The plate-cathode voltage $i$ now follows the plate supply voltage $e$, being negative with respect to the latter by an amount equal to the voltage $h$ across the condenser, and slowly approaches the supply voltage $e$ as the condenser voltage $h$ becomes less negative. During the remaining half $t^2$—$t^3$ of the first cycle, the thyratron anode is negative with respect to its cathode, and the tube is incapable of firing. Variations of the different voltages need be considered only for the operative half cycles, $t'$—$t^2$, $t^3$—$t^4$, etc.

At the start of the second cycle, $t^3$—$t^5$, the grid-cathode voltage $gc^6$ has substantially the same magnitude that it had at the beginning of the first cycle. If the plate-cathode voltage $i$ were then equal to, or greater than the critical plate voltage $c$, as it was at the begining of the first cycle, the tube would fire, but since the plate-cathode voltage $i$ is then less than the critical plate voltage, due to the negative voltage $h$ across the condenser W, the thyratron R is prevented from firing during this second cycle. Consequently, no plate current flows during the second cycle, the condenser voltage $h$ continues to decrease, and the plate-cathode voltage $i$ continues to follow the plate supply voltage $e$ and to approach the latter slowly as the condenser voltage decreases. At the begining of the third cycle, the plate-cathode voltage $i$, while larger than at the beginning of the second cycle, is still too small to make the thyratron conductive, and the thyratron does not fire during the third cycle. However, the condenser voltage $h$ continues to decrease as the condenser discharges through the heater, and under the operating conditions assumed for Fig. 9, the decrease in the condenser voltage is sufficient, by the beginning of the fourth cycle, to allow the thyratron to fire at that time and thereby initiate a repetition of the described operating cycle during the period $t'$—$t^7$.

As the curve of thyratron plate current $g$ of Fig. 9 indicates, the plate current flows only during periods in which the thyratron is conductive, so that in the operation illustrated in Fig. 9, a single pulse of plate current flows during a portion of one-half cycle in every three cycles. The heater current curve $j$ of Fig. 9 is a measure of the heat supplied by the resistance L. As the heater current curve $j$ of Fig. 9 indicates, the current flow in the heater coil L progressively increases during the interval in which the thyratron is firing, and reaches its maximum value as the thyratron is extinguished. Thereafter, the heater current $j$ of Fig. 9 decreases as the charge across the condenser W is discharged through the coil L until the thyratron R again fires.

The diagram shown in Fig. 10 includes curves analogous to those shown in Fig. 9 and similarly designated, but some of the Fig. 10 curves differ from the similarly designated curves of Fig. 9 in consequence of the fact that in the Fig. 10 operating condition the temperature of the thermometer resistance K is so substantially below its normal value that the thyratron is conductive during a portion of the first half of each cycle of alternation. In the Fig. 10 condition of operation, the bridge P develops an output voltage which, when amplified, is like the voltage component $b^7$ of Fig. 4, being in phase with the plate supply voltage $e$. In consequence, the grid-cathode voltage $gc^7$ of Fig. 10 may be positive, and not merely less negative, with respect to the grid voltage $gc^6$ of Fig. 9, during the first half of each cycle.

In the Fig. 10 condition of operation, the grid-cathode voltage $gc^7$ causes the thyratron to fire during the first cycle of alternation just as does the grid-cathode voltage $gc^6$ in the condition of operation illustrated in Fig. 9. With the Fig. 10 condition of operation, however, at the beginning of the second cycle, the grid-cathode voltage $gc^7$ is also of sufficient magnitude to cause the thyratron to fire, although the plate-cathode voltage $i$ of Fig. 10 is then quite far below the critical plate voltage $c$, and this is the case also for the successive cycles of Fig. 10.

Thus in the condition of operation illustrated in Fig. 10, the thyratron fires and the condenser W charges during each cycle. The plate current curve $g$ of Fig. 10 thus includes a plate current pulse for each cycle, and the heating resistance current $j$ rises rapidly during the first half of the first cycle, and thereafter remains at a relatively high value, decreasing only slightly following each firing operation and increasing to its maximum value during the initial portion of each firing operation. Thus, while the operating condition illustrated in Fig. 10 continues, the heating resistance L supplies heat to the pyrometer body A at a relatively high and practically constant value, as is desirable when the pyrometer temperature remains substantially below its normal value.

The diagrams of Figs. 8, 9, and 10 collectively illustrate the fact that with the control system shown in Fig. 2, the rate at which heat is supplied to the pyrometer body by the heating coil L is subject to a graduated control, which is proportional to the difference between the actual and control point temperatures of the body A. Fig. 8 shows the limit of the control range in which no heat at all is being supplied to the pyrometer body, and Fig. 10 illustrates the other limit of the control range in which heat is being supplied to the pyrometer body at the maximum rate which the particular apparatus design shown will permit. Fig. 9 shows an intermediate condition in which heat is continuously supplied to the pyrometer body at an average rate which decreases as the intervals between successive firing half cycles increases. As has been indicated, when the operating condition is of the general character shown in Fig. 9, the variations in the grid-cathode voltage, which may occur in practice, will cause the thyratron R to fire once during every five or four or three or two cycles as the grid-cathode voltage becomes progressively less negative than the value indicated by the value $gc$ of Fig. 8, until it attains the value at which the thyratron fires during every cycle.

The control system of Fig. 2 is not affected in its accuracy of operation by normal variations in the voltage of the source which supplies the transformer U with energizing current. For example, when the voltage of said source is nominally 115 volts, variations in voltage between 90 volts and 130 volts will not affect the accuracy with which the apparatus maintains the temperature of the pyrometer body A constant at the required value. This freedom from undesirable effects due to supply voltage fluctuations is obtained by energizing both the resistance bridge P and the thyratron R directly from the same source of alternating voltage. With this arrangement, upon an increase in the voltage supplied to the transformer primary winding 19, the plate-cathode voltage supplied to the thyratron R will be increased in a positive direction, which would normally tend to cause more heat to be supplied to the body A than that required to maintain the desired temperature of the body. However, in the apparatus of Fig. 2, such a supply voltage increase also produces an increase in the input and output voltages of the bridge P, with the result that the grid-cathode voltage supplied to the thyratron R will be increased. Due to the linearity of the grid-control characteristic of the thyratron R, this increase in grid-cathode voltage will compensate for the simultaneous increase in plate-cathode voltage, and the operation of the thyratron R will continue normally as though no supply voltage increase had occurred.

Upon a decrease in the supply voltage, the apparatus of Fig. 2 functions in a manner similar to that described above to maintain normal operation of the system. That is, both the plate-cathode and grid-cathode voltages of the thyratron R will be decreased simultaneously, and hence one decrease will compensate for the other and therefore provide continued normal operation of the thyratron R.

While the values of the components and voltages employed in the system shown in Fig. 2 may vary widely, they should be properly related. In one operative embodiment of the system shown in Fig. 2, the voltages induced in the transformer secondary windings 15, 16, 17 and 18 are 15 volts, 270 volts, 225 volts and 6.3 volts, respectively. In that embodiment of the invention, the resistances and capacities of the various resistor and condenser elements are as follows:

| | | |
|---|---|---|
| Resistor 10 | ohms | 1500 |
| Resistor 11 | do | 1500 |
| Resistor 12 | do | 1750 |
| Resistor 22 | megohm | 1 |
| Resistor 24 | do | 0.1 |
| Resistor 25 | ohms | 2500 |
| Resistor 27 | megohm | 1 |
| Resistor K | ohms | 1500 |
| Resistor L | do | 800 |
| Condenser 21 | microfarad | 0.002 |
| Condenser 23 | do | 0.02 |
| Condenser 26 | do | 25.0 |
| Condenser 28 | do | 0.1 |
| Condenser 31 | do | 8.0 |
| Condenser W | do | 24.0 |

While, in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims, and that in some cases certain features of our invention may be used to advantage without a corresponding use of other features.

Having now described our invention, what we claim as new and desire to secure by Letters Patent, is:

1. Apparatus for maintaining the average value of a fluctuating current flowing through a resistor proportional to the value of a variable control condition comprising in combination a thyratron having an anode, a cathode, and a control grid, an impedance including said resistor and a condenser in parallel therewith, conductors adapted to connect a source of alternating current in series with said impedance, anode and cathode and thereby form the output circuit of said thyratron, the capacity of said condenser and the resistance of said resistor being related to one another so that said condenser may maintain a diminishing current flow through said resistor during a plurality of cycles of alternation of said current following each half cycle in which said thyratron becomes conductive and thereby progressively increase the plate-cathode voltage of said thyratron, an element responsive to the value of said condition, and bias means actuated by said element to increase the potential of said grid relative to that of said cathode as the value of said condition departs from a predetermined normal value whereby said thyratron is made conductive at intervals which correspond to the duration of one or more cycles of alternation of said current and which vary inversely with the departure of said control condition from its normal value.

2. Apparatus for supplying heat to a device to maintain the latter at an approximately constant temperature, comprising in combination a thyratron having an anode, a cathode, and a control grid, an impedance including a heating resistor and a condenser in parallel therewith, conductors adapted to connect a source of alternating current in series with said impedance, anode and cathode and thereby form the output circuit of said thyratron, the capacity of said condenser and the resistance of said resistor being related to one another so that said condenser may maintain a diminishing current flow through said resistor during periods each corresponding to one or more cycles of alternation of said current following each half cycle in which said thyratron becomes conductive, and thereby progressively increase the plate-cathode voltage of said thyratron during said period, an element responsive to the temperature of said device and bias means actuated by said element to increase and decrease the potential of said grid relative to that of said cathode as the temperature of said device decreases and increases, whereby said thyratron is made conductive and terminates each such period at a time jointly dependent on said biasing voltage and on said plate-cathode voltage.

3. Apparatus as specified in claim 2, in which said device is a relatively massive metallic body to be maintained at an approximately constant temperature, and in which said temperature responsive element is a thermometer resistance and in which the latter and said heating resistor are each mounted in said body.

4. Apparatus as specified in claim 2, in which the element responsive to the temperature of said device is a thermometer resistance and in which said bias means comprises a bridge circuit including said thermometer resistance and energized by the said source of alternating current and operating to impress an alternating potential on said control grid varying in accordance with changes in the temperature of said device, and in which said thyratron has a substantially linear grid-control characteristic whereby upon a change within predetermined limits in the voltage of the source of alternating current, said energizing voltage and said control voltage will be changed by amounts proportional to the first mentioned voltage change, and said current flow through said load impedance will be unaffected by said first mentioned voltage change.

WILLIAM H. WANNAMAKER, JR.
JAMES C. MOUZON.

REFERENCES CITED

The following references are of record in the file of this patent:

UNITED STATES PATENTS

| Number | Name | Date |
|---|---|---|
| 1,694,264 | Hull | Dec. 4, 1928 |
| 2,126,398 | Knowles | Aug. 9, 1938 |
| 2,132,264 | King | Oct. 4, 1938 |
| 2,189,462 | Donle et al. | Feb. 6, 1940 |

FOREIGN PATENTS

| Number | Country | Date |
|---|---|---|
| 514,196 | Great Britain | Nov. 1, 1939 |